United States Patent [19]
Hotta et al.

[11] Patent Number: 5,917,529
[45] Date of Patent: *Jun. 29, 1999

[54] IMAGE FORMING APPARATUS HAVING RELATIONSHIP BETWEEN DRIVING GEAR PITCH AND SCANNING LINE PITCH

[75] Inventors: Yozo Hotta, Susono; Masahiro Goto, Mishima; Toshio Miyamoto, Numazu, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/729,698

[22] Filed: Oct. 7, 1996

[30] Foreign Application Priority Data

Oct. 9, 1995 [JP] Japan ................... 7-261787

[51] Int. Cl.$^6$ ...................... B41J 2/47
[52] U.S. Cl. .............. 347/129; 347/248; 399/167
[58] Field of Search ................ 347/129–131, 347/153, 154, 252, 262, 264, 248; 399/167

[56] References Cited

U.S. PATENT DOCUMENTS 5,225,851  7/1993  Schoon .
5,291,223  3/1994  Ogane et al. .
5,371,576  12/1994  Gonda .
5,473,421  12/1995  Maruyama et al. ............. 399/39
5,642,146  6/1997  Uchiyama ..................... 347/130

FOREIGN PATENT DOCUMENTS 58-5712    1/1983   Japan .
61-100765  5/1986   Japan .
63-267977  11/1988  Japan .
2-149067   6/1990   Japan .
4-16966    1/1992   Japan .

*Primary Examiner*—Robert Beatty
*Attorney, Agent, or Firm*—Fitzpatrick, Cella Harper & Scinto

[57] ABSTRACT

An image forming apparatus includes an image bearing member; a scanning device for scanning the image bearing member in accordance with image data; driving source for driving the image bearing member; and a gear for transmitting power to the image bearing member from the driving source.

The movement pitch of the image bearing member corresponding to a gear pitch of the gear, and a line pitch of a basic matrix for tone gradation printing are sufficiently different to prevent interference fringe of the image.

6 Claims, 4 Drawing Sheets

IMAGE FORMING APPARATUS HAVING RELATIONSHIP BETWEEN DRIVING GEAR PITCH AND SCANNING LINE PITCH

FIELD OF THE INVENTION AND RELATED ART

The present invention relates to an image forming apparatus such as a laser beam printer or a LED printer for outputting an image by scanning an image bearing member in accordance with image signals.

Heretofore, an image forming apparatus using an electrophotographic type process, such as a digital copying machine or a laser beam printer, receives a command relating to printing (printing instructions, print controlling signals or the like) and coded letter and image information from a host device such as a computer, work station or another external information processing equipment, and the code information is converted to pixel information by a formatter. When the conversion is carried out, image information such as a photography including density information, is subjected to an image processing such as a dither matrix processing, for example, and is binarized.

Subsequently, the printing is carried out on the basis of the image information by the electrophotographic engine portion. The engine portion includes an electrophotographic photosensitive member, a charging roller, a developing device, a cleaner or the like. The electrophotographic photosensitive member includes a base member in the form of a drum made of aluminum, nickel or the like, a photosensitive layer thereon made of OPC, amorphous Se, amorphous Si or the like.

In operation, the surface of the photosensitive member (photosensitive drum) is uniformly charged by the charging roller. Subsequently, the image signal raster-scans the photosensitive drum surface by a laser scanner. The laser scanner scans the drum with on-off semiconductor laser beam, using a polygonal scanner, and an optical spot image is formed on the photosensitive drum surface through an optical system and a folding mirror. By this, an electrostatic latent image is formed on the drum. The electrostatic latent image is developed (visualized) by a developing device with toner through a jumping development process, two component developer development process or FEED development process. In an image forming apparatus of digital type, the image portion exposure and the reverse development are combined, in many cases. More particularly, the latent image is formed by image portion exposure by which charge on the image portion is removed by laser (projection). The development is effected by reverse development by which the toner is deposited to the portion from which the charge is removed.

The toner image formed on the photosensitive drum by the development, is transferred onto the transfer material. The transfer material which may be a paper or the like, is accommodated in a sheet feeding cassette, and when a print signal is fed from a host device, it is fed out by a pick-up roller one by one. The transfer material thus fed is timed by timing rollers in synchronism with the image signal, and the toner image is properly transferred by the transfer roller. The transfer roller comprises an electroconductive elastic member having low hardness, and forms a nip between the photosensitive drum. The transfer material is nipped by the nip, and a bias electric field is applied in the nip. By this, the toner image is electrostatically transferred from the photosensitive drum onto the transfer material surface.

The transfer material carrying an unfixed toner image on the surface, fed to a fixing device where the toner image is fixed thereon, and is discharged onto a sheet discharge tray by sheet discharging rollers. On the other hand, the untransferred toner remaining on the photosensitive drum without being transferred onto the transfer material, is removed by a cleaning blade of a cleaner.

As regards the control in such an image forming apparatus, an emission intensity of the semiconductor laser in the laser scanner, and an emission duty, are controlled by an exposure control means. The applied bias to the charging roller, the applied bias to the developing device and the applied bias to the transfer roller, are controlled by a high voltage control means. The main motor and the scanner are controlled by motor control means. A pressure and temperature of the fixing device, are controlled by fixing control means. The operations of the sheet feeding roller and the timing roller, are controlled by a sheet feeding control means.

The photosensitive drum is driven by a drum gear. The drum gear has a pitch circle which has a circumferential length the same as that of the photosensitive drum, and is integrally mounted to one end of the photosensitive drum. The driving force from the driving motor is transmitted eventually to the photosensitive drum through the driving gear and the drum gear meshed therewith, or the like. At this time, the machining accuracy of the teeth surfaces of the driving gear and the drum gear, is so high that the smooth rotation of the photosensitive drum is accomplished, thus preventing deterioration of the image due to non-uniform rotation.

However, in the case of the photosensitive drum in the above-described image forming apparatus, rotation non-uniformity occurs slightly, when the driving gear and the drum gear are meshed with each other, even if the machining accuracy of the teeth surfaces of the driving gear and the drum gear is enhanced. Therefore, when a half-tone image is printed, banding appears on the image, correspondingly to the gear pitch of the drum gear. Here, banding is a periodical density non-uniformity in a transfer material feeding direction, brought about by the main assembly of the image forming apparatus.

As a counter measure, it has been proposed that a pulley is used in place of the drum gear, and the pulley is driven by a rubber belt or the like to prevent the banding. In this case, however, slip tends to occur, and the amount of wear in long term use is relatively large. Therefore, rotation non-uniformity of the photosensitive drum results although the cause is different.

As another preventing measure, it would be considered to reduce the module of the drum gear, and the gear pitch thereof is reduced. In order to reduce the module m which is the diameter d mm of the pitch circle of the gear divided by the number of gears z, the number z may be increased when the pitch circle is constant. The clearance of the banding produced for each gear pitch when a pattern image is printed, decreases in accordance with decrease of the drum gear pitch, so that it becomes less remarkable visually.

The gear pitch of the conventional drum gear is sufficiently large as compared with the pitch of the basic matrix for tone gradation printing, and therefore, interference fringes (dark and light pattern) are not produced due to closeness between the gear pitch and the image pitch. But, when the gear pitch is decreased by decreasing the module m of the drum gear to make the banding less remarkable, the gear pitch becomes close to the pitch of the basic matrix for the tone gradation printing, with the possible result of production of the interference fringes due to the interference on the resultant image.

SUMMARY OF THE INVENTION

Accordingly, it is a principal object of the present invention to provide an image forming apparatus wherein a banding due to the gear pitch and the interference fringes due to the pitch of the basic matrix, are both suppressed.

According to an aspect of the present invention, there is provided an image forming apparatus comprising: an image bearing member; scanning means for scanning said image bearing member in accordance with image data; driving source for driving said image bearing member; a gear for transmitting power to said image bearing member from said driving source; wherein the following is satisfied:

$a \leq 1.51$, and $b/a < 0.752$ or $b/a > 1.277$ where a mm is a movement pitch of said image bearing member corresponding to a gear pitch of said gear, and b mm is a pitch of a basic matrix for tone gradation printing.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

Figure 1:
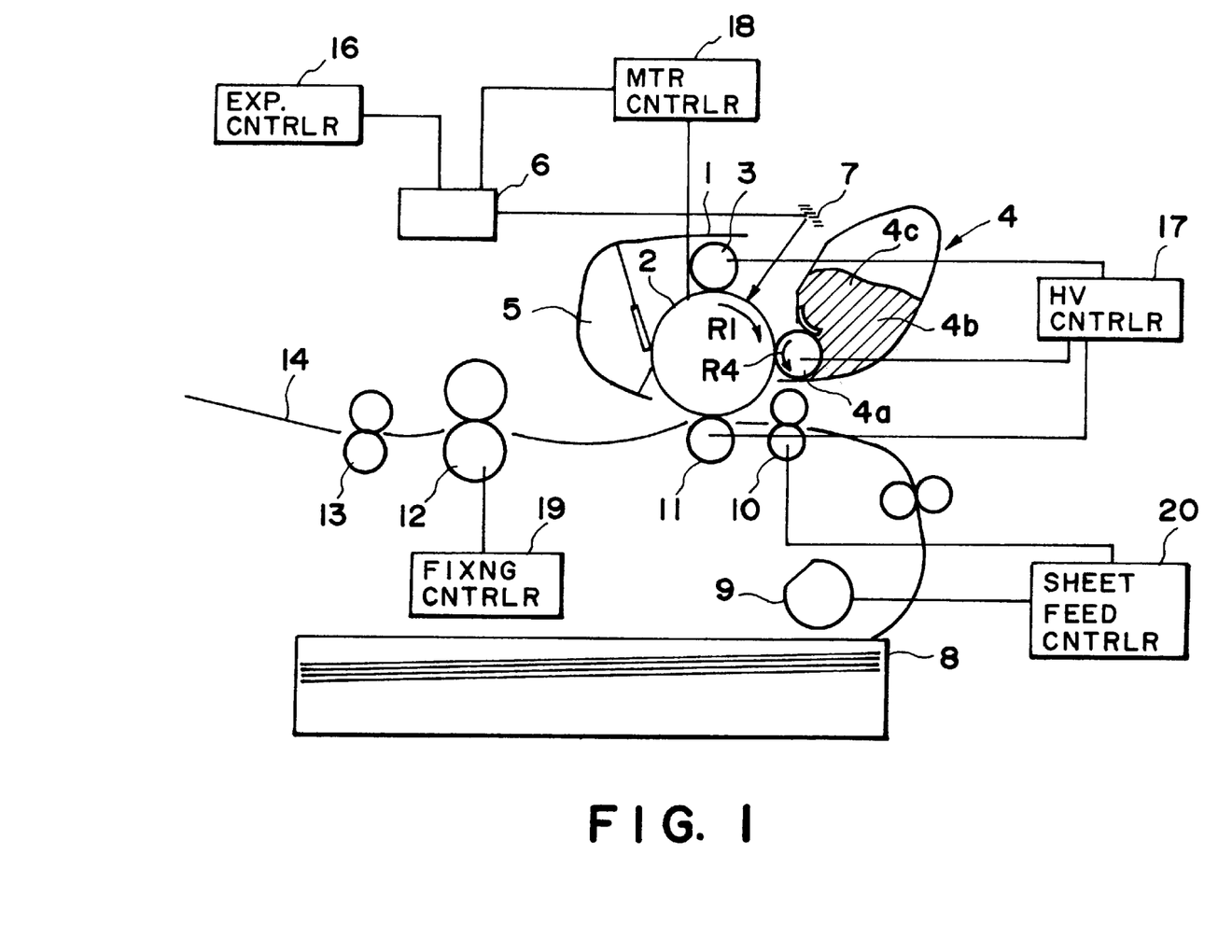
FIG. 1 is a schematic illustration of an image forming apparatus according to an embodiment of the present invention.

FIG. 1 is a schematic illustration of an electrophotographic printer as an example of an image forming apparatus according to an embodiment of the present invention.

The description will be made as to the entirety structure and operation of the image forming apparatus, referring to FIG. 1.

In this figure, reference 1 designates a process cartridge, and it contains an electrophotographic photosensitive member as the image bearing member 2, charging roller 3, developing device 4 and cleaner 5, in a cartridge container. The electrophotographic photosensitive member 2 comprises a cylindrical base of aluminum k nickel or the like, and a photosensitive layer, thereon, which is of OPC, amorphous Se, amorphous Si or the like. It is generally in the form of a drum.

The electrophotographic photosensitive member in the form of a drum (photosensitive drum) 2 is rotated in the direction indicated by an arrow R1 by a driving means (unshown), during which the surface thereof is uniformly charged by the charging roller 3. Subsequently, the image signal raster-scans the photosensitive drum 2 surface by a laser scanner 6. The laser scanner 6 scans the drum with on-off semiconductor laser beam, using a polygonal scanner, and an optical spot image is formed on the photosensitive drum 2 surface through an optical system and a folding mirror. By this, an electrostatic latent image is formed on the photosensitive drum 2 surface. The electrostatic latent image is developed (visualized) by a developing device 4 with toner through a jumping development process, two component developer development process or FEED development process. In the development, toner 4b is carried on a developing roller 4a surface, and the layer thickness of the toner layer is regulated by a regulation blade 4c, and the developing roller 4a is rotated in the direction of arrow R4 to feed the toner to the development position where it is faced to the photosensitive drum 2. In an image forming apparatus of digital type, the image portion exposure and the reverse development are combined, in many cases. More particularly, the latent image is formed by image portion exposure by which charge on the image portion is removed by laser (projection). The development is effected by reverse development by which the toner is deposited to the portion from which the charge is removed.

The toner image formed on the photosensitive drum 2 by the development, is transferred onto the transfer material. The transfer material which may be a paper or the like, is accommodated in a sheet feeding cassette 8, and when a print signal is fed from a host device, it is fed out by sheet feeding roller 9 one by one. The transfer material thus fed is timed by timing rollers 10 in synchronism with the image signal, and the toner image is properly transferred by the transfer roller 11. The transfer roller 11 comprises an electroconductive elastic member having low hardness, and forms a nip between the photosensitive drum 2. The transfer material is nipped by the nip, and a bias electric field is applied in the nip. By this, the toner image is electrostatically transferred from the photosensitive drum 2 surface onto the transfer material surface.

The transfer material carrying an unfixed toner image on the surface, fed to a fixing device 12 where the toner image is fixed thereon, and is discharged onto a sheet discharge tray 14 by sheet discharging rollers 13. On the other hand, the untransferred toner remaining on the photosensitive drum without being transferred onto the transfer material, is removed by a cleaning blade of a cleaner 5.

As regards the control in such an image forming apparatus, an emission intensity of the semiconductor laser in the laser scanner, and an emission duty thereof, are controlled by an exposure control means 16. The applied bias to the charging roller 3, the applied bias to the developing roller 4a and the applied bias to the transfer roller 11, are controlled by a high voltage control means 17. The main motor and the scanner are controlled by motor control means 18. A pressure and temperature of the fixing device 12, are controlled by fixing control means 19. The operations of the sheet feeding roller 9 and the timing roller 10, are controlled by a sheet feeding control means 20.

Figure 2:
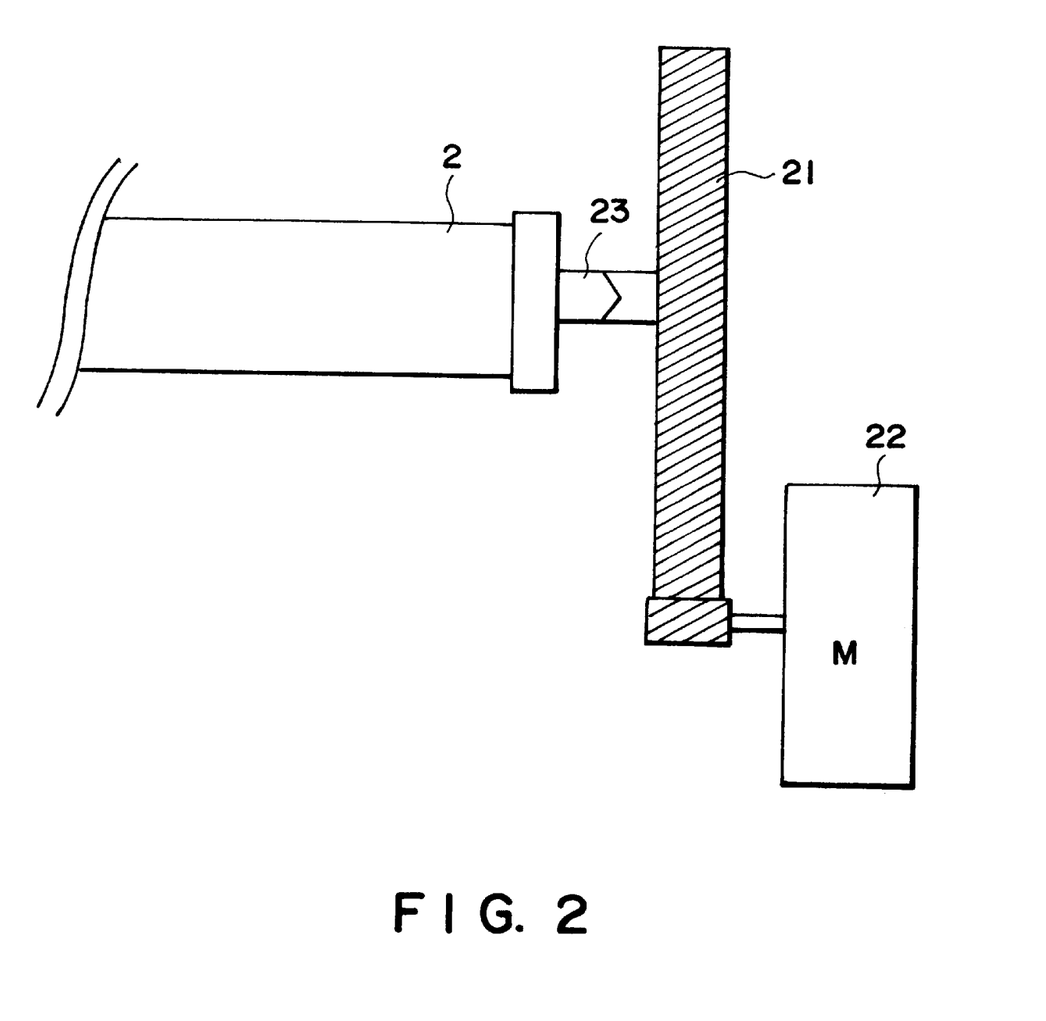
FIG. 2 is a schematic illustration of a large gear and an image bearing member of an image forming apparatus according to an embodiment of the present invention

When the process cartridge 1 is mounted in the main assembly of the apparatus, the photosensitive drum 2 is driven by the drum gear 21 provided in the main assembly through the drum flange 23 as shown in FIG. 2. The drum gear 21 is driven by a motor 22.

In this example, the diameter of the pitch circle of the drum gear is made large, and in addition, the number of the teeth of the drum gear is increased more than the corresponding degree to decrease the module of the drum gear, by which the gear pitch of the photosensitive drum 2 is decreased, and the intervals of the banding is reduced. By doing so, the banding is less remarkable. Here, the gear pitch of the photosensitive drum 2 means a distance of movement of one point on the photosensitive drum 2 surface when the drum gear rotates through a circle pitch (pitch circle divided by the number of teeth).

Table 1 shows a relation between the gear pitch and the banding in the image forming apparatus of this embodiment.

TABLE 1

Gear pitch and banding level

| Gear pitch (mm) | 0.24 | 0.32 | 0.49 | 0.62 | 0.81 | 1.24 | 1.51 | 1.75 |
|---|---|---|---|---|---|---|---|---|
| Banding level | E | E | E | G | G | F | F | NG |

E: Excellent
G: Good
F: Fair
NG: No good

Figure 3:
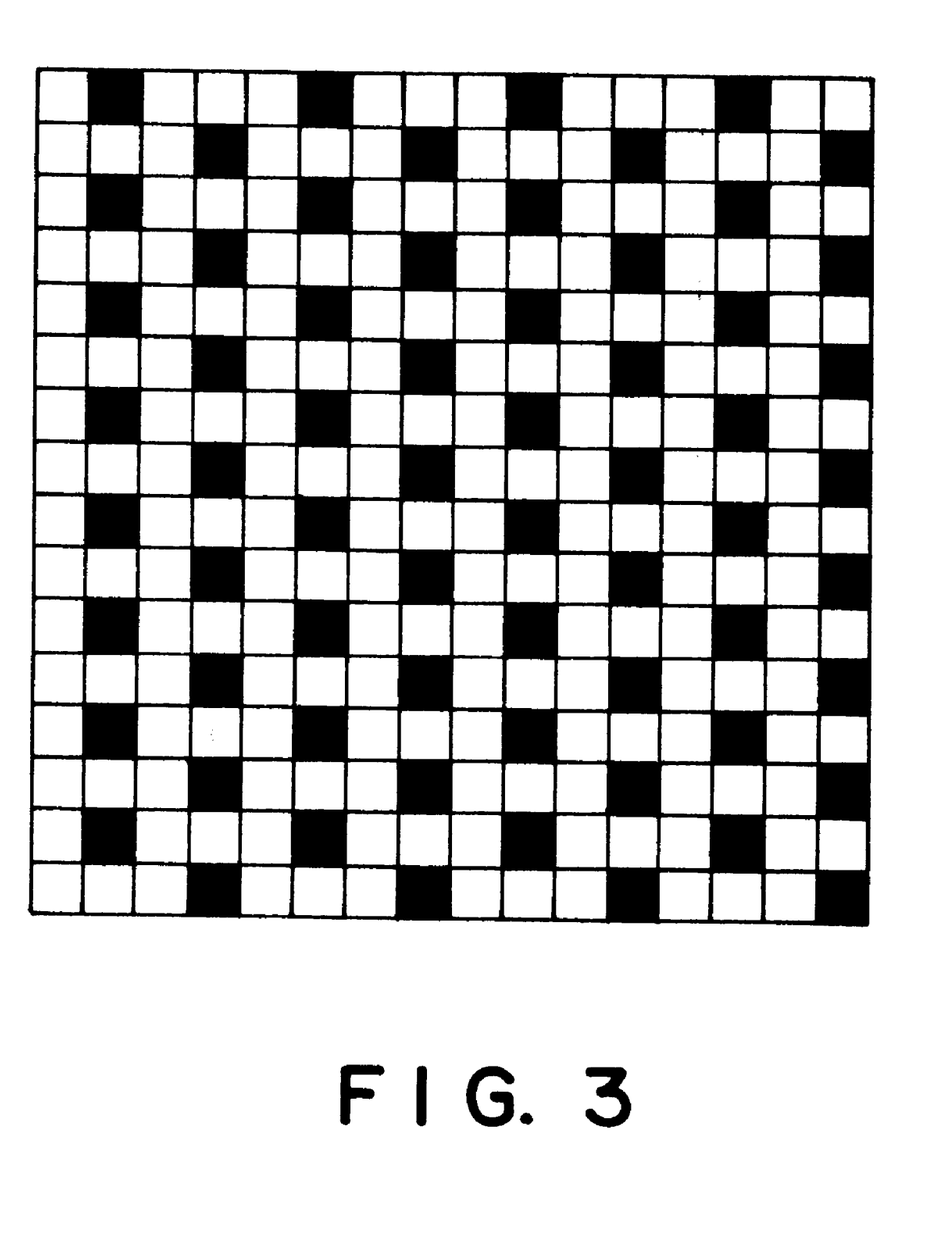
FIGS. 3, 4 show image patterns for explanation of the present invention.

In Table 1, the banding level is evaluated on the basis of whether the density non-uniformity corresponding to the gear pitch is visually conspicuous or not, using a knight jump dot pattern (one dot and two space) shown in FIG. 3 with the resolution of 600 dpi. From this, the image non-uniformity due to the drum driving gear can be decreased if the gear pitch is not more than 1.51 mm, preferably not more than 0.81 mm, and further preferably not more than 0.49 mm. The gear pitch was changed by changing the outer diameter of the gear while fixing the module of the gear at 0.5, thus changing the number of teeth.

As will be understood from Table 1, by decreasing the gear pitch of the image bearing member, the movement distance by the rotation corresponding to one tooth of the drum gear is decreased, by which the interval of the banding is decreased to such an extent that the it is not easily visible. The rotation non-uniformity due to the gear driving may be caused by meshing error between teeth, but by decreasing the module, the meshing area is decreased, so that the influence of the meshing error due to the configuration of the tooth surface of the gear can be reduced, by which the banding level is further improved. The rotation non-uniformity due to the meshing between the gears is reduced with increase of the accuracy of the teeth surface of the gear, but it is difficult to provide ideal tooth surface configuration, as is known. In this embodiment, by decreasing the module, banding can be reduced in this respect, and simultaneously therewith, the gear manufacturing is easy.

However, when the gear module is decreased, the strength of the gear surface is decreased, and therefore, it does not endure long term use. In this embodiment, the outer diameter of the gear is made larger as compared with the outer diameter of the photosensitive drum, and the number of driving gear teeth is increased, by which the gear pitch can be decreased without extremely decreasing the module of the gear. Simultaneously, the load applied to one tooth of the gear can be decreased, and therefore, the module can be reduced also from the viewpoint of the strength (for example when the necessary has the same outer diameter as the photosensitive drum, the module is required to be not less than 0.8).

However, by decreasing the gear pitch of the photosensitive drum 2, the gear pitch becomes closer to the pitch of the number of basic lines for forming the half-tone (line pitch in the paper feeding direction), and an interference fringes is produced. The number of the basic lines of a printer is the number of the lines when image data (multi-level information) having density information and fed from an external inputting device, is binarized by a formatter of an image forming apparatus. Usually, the formatter of the image forming apparatus has one or more numbers of the basic lines.

More particularly, when a printer receives image data having density information (8 bit) from an external information processing equipment (personal computer, work station or the like), the printer effects conversion for reproduction of half-tone by the predetermined half-tone processing method (for example dither process, error diffusion method or the like). If, for example, a printer having a resolution of 600 dpi converts the 8 bit density information through 8×8 dither matrix method, the number of the basic lines at this time is 75. When the pitch of the photosensitive drum driving gear 21 of the printer is 0.4 mm (the photosensitive drum can be driven with gear pitch of approx. 0.4 mm when the outer diameter of the photosensitive drum 2 is ø30 mm, the outer diameter of the driving gear 21 is ø117 mm, and number of gear teeth is 235), even a slight density non-uniformity is emphasized since the pitch is very close to the line pitch of the basic lines, which is 0.339 mm.

Table 2 shows production of the interference fringes due to the number of basic lines for formation of half-tone and a gear pitch of the photosensitive drum 2. In this Table, the use was made with a laser beam printer having a resolution 600 dpi, and the size of the dither matrix and the pitch of the photosensitive drum driving gear, are changed, and the beat was checked. When 4×4 dither matrix is used, the line number is 150, and when 8×8 dither matrix is used, the line number is 75.

TABLE 2

| Line No. (lines/inch) | | | Drum gear pitch a (mm) | | | | | | | | |
|---|---|---|---|---|---|---|---|---|---|---|---|
| | Screen angle, Line pitch b (mm) | | 0.24 (b/a) | 0.32 (b/a) | 0.4 (b/a) | 0.49 (b/a) | 0.53 (b/a) | 0.62 (b/a) | 0.9 (b/a) | 1.8 (b/a) | 2.86 (b/a) |
| 1 300, | 0°, | b = 0.0847 | G 0.353 | G 0.265 | G 0.212 | G 0.173 | G 0.160 | G 0.137 | G 0.0941 | G 0.0470 | G 0.0296 |
| 2 200, | 0°, | b = 0.127 | G 0.529 | G 0.397 | G 0.318 | G 0.259 | G 0.240 | G 0.205 | G 0.141 | G 0.0705 | G 0.0444 |
| 3 150, | 0°, | b = 0.169 | G 0.706 | G 0.529 | G 0.423 | G 0.346 | G 0.319 | G 0.273 | G 0.187 | G 0.0938 | G 0.0590 |
| 4 120, | 0°, | b = 0.212 | NG 0.882 | G 0.661 | G 0.529 | G 0.432 | G 0.399 | G 0.341 | G 0.235 | G 0.117 | G 0.0741 |
| 5 100, | 0°, | b = 0.254 | NG 1.058 | NG 0.794 | G 0.635 | G 0.518 | G 0.479 | G 0.410 | G 0.282 | G 0.141 | G 0.0888 |
| 6 85.7, | 0°, | b = 0.296 | NG 1.235 | NG 0.926 | F 0.741 | G 0.605 | G 0.559 | G 0.478 | G 0.328 | G 0.164 | G 0.103 |
| 7 75, | 0°, | b = 0.339 | G 1.411 | NG 1.058 | NG 0.847 | G 0.691 | G 0.639 | G 0.546 | G 0.376 | G 0.188 | G 0.118 |
| 8 60, | 0°, | b = 0.423 | G 1.764 | F 1.323 | NG 1.058 | NG 0.864 | NG 0.799 | G 0.683 | G 0.470 | G 0.235 | G 0.147 |

TABLE 2-continued

| Line No. (lines/inch) Screen angle, Line pitch b (mm) | | | Drum gear pitch a (mm) | | | | | | | | |
|---|---|---|---|---|---|---|---|---|---|---|---|
| | | | 0.24 (b/a) | 0.32 (b/a) | 0.4 (b/a) | 0.49 (b/a) | 0.53 (b/a) | 0.62 (b/a) | 0.9 (b/a) | 1.8 (b/a) | 2.86 (b/a) |
| 9 | 50, | 0°, b = 0.508 | G 2.117 | G 1.588 | NG 1.270 | NG 1.037 | NG 0.958 | NG 0.819 | G 0.564 | G 0.282 | G 0.177 |
| 10 | 37.5, | 0°, b = 0.677 | G 2.820 | G 2.115 | G 1.692 | G 1.381 | NG 1.277 | NG 1.091 | NG 0.752 | G 0.376 | G 0.236 |
| 1 | 212 (212/√2 = 150), | 45°, b = 0.169 | G 0.706 | G 0.529 | G 0.423 | G 0.346 | G 0.319 | G 0.273 | G 0.187 | G 0.0938 | G 0.0590 |
| 1 | 141 (100√2), 45°, | 45°, b = 0.254 | NG 1.058 | NG 0.794 | G 0.635 | G 0.518 | G 0.479 | G 0.410 | G 0.282 | G 0.141 | G 0.0888 |
| 1 | 106 (75√2), | 45°, b = 0.339 | G 1.411 | NG 1.058 | NG 0.847 | G 0.691 | G 0.639 | G 0.546 | G 0.376 | G 0.188 | G 0.118 |
| 1 | 70.7 (50√2), | 45°, b = 0.508 | G 2.117 | G 1.588 | NG 1.270 | NG 1.037 | NG 0.958 | NG 0.819 | G 0.564 | G 0.282 | G 0.177 |

In Table 2, "G" means that no interference fringes is produced, "F" means that interference fringes is produced, but is tolerable, and "N" means that non-tolerable interference fringes is produced.

The gear pitch a (mm) of the photosensitive drum 2 in Table 2, is expressed by $a=(d\times\pi)/c$, where d is a diameter of the photosensitive drum 2, and c is number of the teeth of the large gear 21.

Figure 4A:
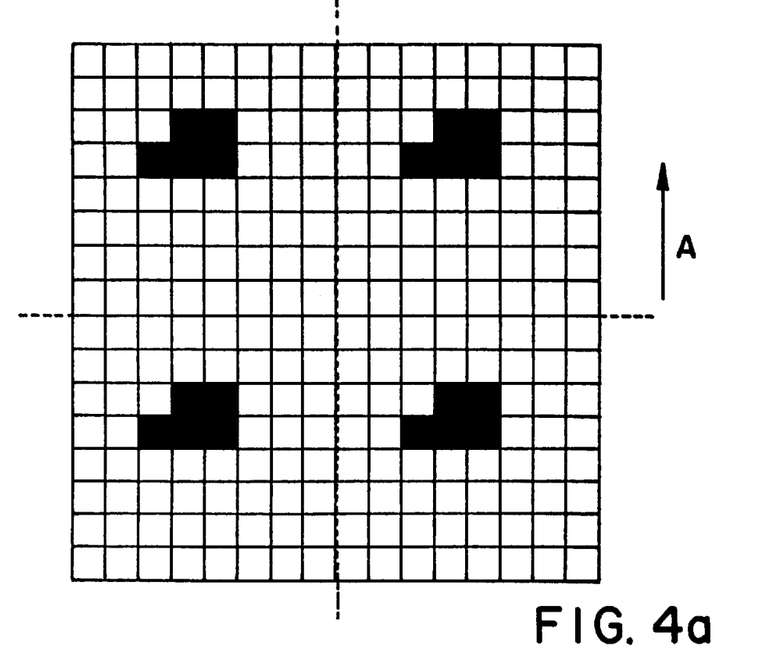
Figure 4B:
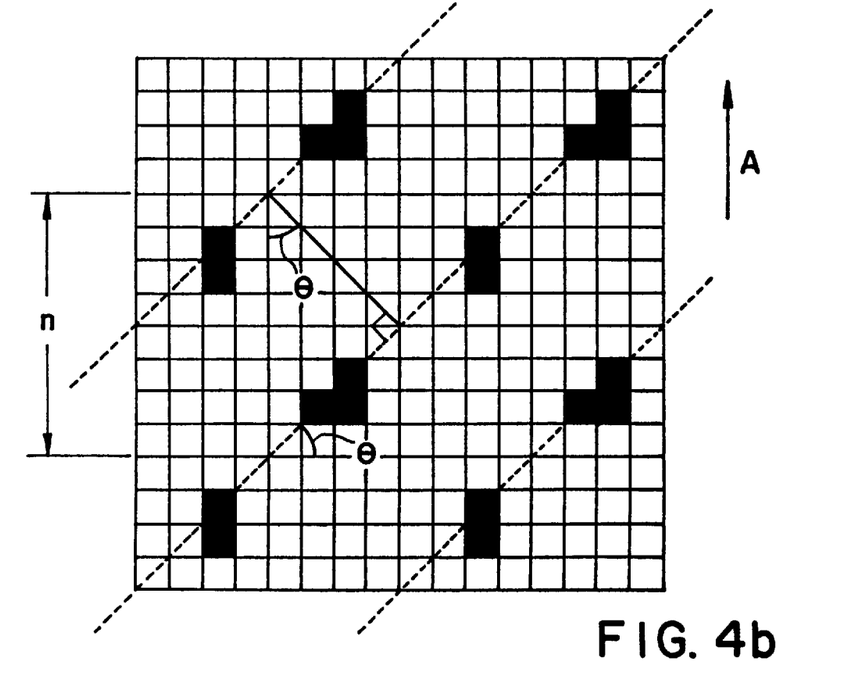

As shown in FIG. 4a, when the screen angle is 0°, the number L of lines in the sub-scanning direction (the recording material feeding direction), it is expressed by $L=r/n$, where n×n is a size of the dither matrix, and r is a resolution). FIG. 4a shows an 8×8 dither matrix, and if the resolution of the printer is 600 dpi, the number of the lines L is 600/8=75. When a screen angle (a angle θ of center line of dot growth relative to a main-scanning direction which is perpendicular to the paper feeding direction A) is formed, the number L' is $r/(n\times\cos\theta)$, where n is a dot number in the paper feeding direction, and r is a resolution. As will be understood from Table 2, in this case, the production of the interference fringes is determined by the relation between the pitch in the paper feeding direction and the photosensitive drum gear pitch. Therefore, also when the screen angle θ is considered, it will suffice if the number $L=r/n\times\cos\theta$ satisfy the predetermined relation relative to the drum gear pitch.

From Table 2, the relation between the line pitch b determined by the number L of lines for formation of half-tone and the drum gear pitch a:

$$b/a < 0.752 \quad (1), \text{ or}$$

$$b/a > 1.277 \quad (2), \text{ or}$$

preferably $$b/a \leq 0.741, \text{ or}$$

$$a \geq 1.323$$

By satisfying this, the interference fringes can be prevented in half-tone image formation. The relations are represented using the line number for half-tone image formation, drum gear teeth number c, and photosensitive drum diameter d, as follows:

$$(25.4/l)/(d\times\pi)/c > 1.277$$

preferably $$(25.4/l)/(d\times\pi)/c \leq 0.741, \text{ or}$$

$$(25.4/l)/(d\times\pi)/c \geq 1.323$$

EMBODIMENT 2

The electrophotographic printer used in this example is similar to that of Embodiment 1.

When the gear pitch of the photosensitive drum 2 (frequency f1) and a basic line number (frequency f2) for formation of the half-tone do not satisfy (1) or (2) in Embodiment 1 with the result of production of interference fringes. Once the image forming apparatus is manufactured, the gear pitch of the photosensitive drum 2 cannot be changed. In this embodiment, the basic line number is changed to the number closest to the one satisfying (1) or (2), so that the banding is made less remarkable without losing the tone gradation and density of the image.

Using Table 2, when the resolution is 600 dpi, and the gear pitch of the photosensitive drum 2 is 0.9 mm, the basic line number for formation of the half-tone, is changed to the basic line number for formation of the half-tone (in this case, 100 lines/inch) closest to 75 lines/inch. When the basic line number for the formation of half-tone is changed to 100 lines/inch, the tone gradation number becomes 36. But, the output image is better than the output image of 75 lines/inch since the density difference is not large where the image density is high and since the interference fringes due to the relation between the gear pitch of the photosensitive drum 2 and the basic line number for formation of the half-tone, is not produced.

EMBODIMENT 3

The electrophotographic printer used in this example is similar to that of Embodiment 1.

When the gear pitch of the photosensitive drum 2 (frequency f1) and a basic line number (frequency f2) for formation of the half-tone do not satisfy (1) or (2) in Embodiment 1 with the result of production of interference fringes. Once the image forming apparatus is manufactured, the gear pitch of the photosensitive drum 2 cannot be changed. In this embodiment, the basic line number is changed, and to avoid the tone gradation change, the resolution is changed.

Using Table 2, when the resolution is 600 dpi, and the gear pitch of the photosensitive drum 2 is 0.9 mm, the basic line number for formation of the half-tone, is changed to the basic line number for formation of the half-tone (in this case, 100 lines/inch) closest to 75 lines/inch. In order to maintain the tone gradation at 64, the resolution is changed to 800 dpi, when the basic line number for formation of the half-tone is changed to 100 lines/inch.

Thus, high precision images can be produced without reducing the number of tone gradations.

As described in the foregoing, according to the present invention, by decreasing the gear pitch of the image bearing member, the banding can be improved, and the interference fringes tending to be produced by decreasing the gear pitch, can be prevented by proper selection of a combination of the gear pitch and the number of the basic lines, thus accomplishing high precision image formation.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising:

an image bearing member;

scanning means for scanning said image bearing member in accordance with digital image data;

driving source for driving said image bearing member;

a gear for transmitting power to said image bearing member from said driving source;

a movement pitch of said image bearing member corresponding to a gear pitch of said gear and a line pitch of a basic matrix for tone gradation printing, are sufficiently different to prevent occurrence of interference fringe.

2. An apparatus according to claim 1, wherein said gear is positioned at a position closest to said image bearing member in a power transmission direction.

3. An apparatus according to claim 1, wherein a pitch circle of said gear is longer than a circumferential length of said image bearing member.

4. A process cartridge detachably mountable relative to a main assembly of an image forming apparatus, wherein said image forming apparatus includes scanning means for scanning an image bearing member in accordance with digital image data, a gear for transmitting driving force to the image bearing member, said image forming apparatus is capable of tone gradation printing, said process cartridge comprising:

an image bearing member;

a driving force receiving portion for receiving a driving force for rotating said image bearing member, from the main assembly;

a movement pitch of said image bearing member corresponding to a gear pitch of the gear and a line pitch of a basic matrix for tone gradation printing, being sufficiently different to prevent occurrence of interference fringe.

5. A process cartridge according to claim 4, wherein aid cartridge further comprises at least one of charging means for electrically charging said image bearing member, developing means for developing a latent image formed on said image bearing member and cleaning means for cleaning said image bearing member.

6. A process cartridge according to claim 4, wherein a circumferential length of said image bearing member is shorter than a pitch circle of the gear.

* * * * *

UNITED STATES PATENT AND TRADEMARK OFFICE
CERTIFICATE OF CORRECTION

PATENT NO. : 5,917,529
DATED : June 29, 1999
INVENTOR(S) : YOZO HOTTA, ET AL.

It is certified that error appears in the above-identified patent and that said Letters Patent is hereby corrected as shown below:

COVER PAGE: Item [56]
   Attorney, Agent, or Firm
     Change, "CELLA" to --CELLA,--.

COLUMN 1

Line 19 "photography" should read --photograph--.

COLUMN 3
   Line 33, "3, 4" should read --3, 4a and 4b--.

Signed and Sealed this

Twenty-fifth Day of April, 2000

Attest:

Q. TODD DICKINSON

Attesting Officer     Director of Patents and Trademarks